United States Patent Office 2,952,143
Patented Sept. 13, 1960

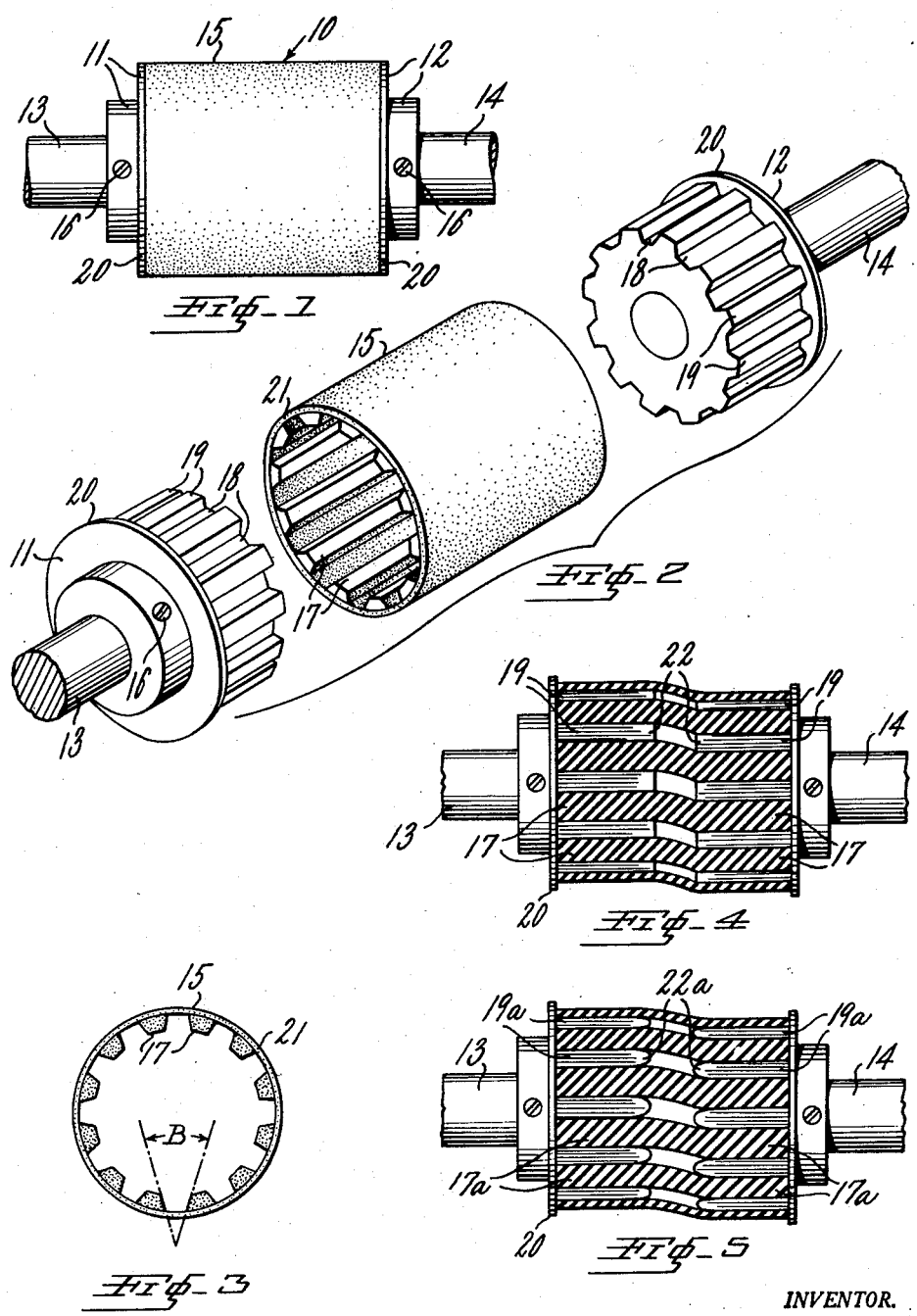

2,952,143

FLEXIBLE SHAFT COUPLINGS

Richard Y. Case, Philadelphia, Pa., assignor to United States Rubber Company, New York, N.Y., a corporation of New Jersey Filed Dec. 1, 1958, Ser. No. 777,480

6 Claims. (Cl. 64—11)

This invention relates to an improved flexible shaft coupling of the type having a flexible load carrying band with resilient axially extending teeth bonded thereto for engaging grooves in oppositely disposed hubs fixed to opposed shafts. Shaft coupling of this type are particularly useful for correcting misalignment of two shafts to be coupled together and for providing a silently operating driving connection between the shafts by virtue of its flexible load carrying band and the resiliency of its power transmitting teeth.

Specifically, this invention is an improvement on the flexible shaft coupling disclosed in U.S. Patent No. 2,859,599 issued November 11, 1958 entitled "Resilient Shaft Coupling," which is hereby incorporated by reference. Heretofore, the axially extending resilient teeth of the coupling sleeve have been constructed with a total included tooth angle of between 10° and 20° and preferably of 15°, which tooth angle is conventional in gears and positive-drive rubber tooth belts. Such a low included tooth angle in a coupling sleeve places the axially extending teeth under very high shear stress which has resulted in premature failure of the coupling sleeve. Although such premature failure could be avoided by increasing the strength of the axially extending teeth, such an expedient would impair the required flexibility of the coupling sleeve.

The object of this invention is to provide a flexible coupling sleeve that resists tooth shear and expansion, but at the same time retains the required flexibility of the axially extending teeth and load carrying band to allow for shaft misalignment.

In accordance with the present invention the axially extending resilient teeth of the coupling sleeve are constructed with a total included tooth angle of between 35° and 50° and preferably between 40° and 45°.

This invention, its objects and advantages are further described in reference to the accompanying drawings, wherein:

Fig. 1 is an assembled view of the shaft coupling embodying this invention;

Fig. 2 is an enlarged exploded isometric view of the shaft coupling showing each of the parts in alignment for assembly;

Fig. 3 is an end view of the coupling sleeve illustrated in Fig. 2;

Fig. 4 is similar to Fig. 1 but with the load carrying band broken away to illustrate the operation of the shaft coupling with shaft misalignment; and Fig. 5 is similar to Fig. 4 but illustrates a modification thereof.

The assembled shaft coupling embodying this invention is shown in Fig. 1, and the unassembled parts thereof are shown in Fig. 2. The coupling 10 comprises oppositely disposed hubs 11 and 12, which are affixed to opposed shafts 13 and 14. The hubs 11 and 12 are adapted to be coupled together by a sleeve 15. The hubs 11 and 12 may be affixed to the shafts 13 and 14 respectively by set screws 16.

The sleeve 15 is provided with evenly spaced axially extending teeth 17 on its inner periphery which are adapted to mesh with corresponding spaced axially extending grooves 18 separated by axially extending lands 19 in the outer periphery of the hubs 11 and 12, which are provided with end flanges 20 for retaining the sleeve in position. Instead of providing end flanges 20, the hubs may have circumferential grooves adapted to receive rings (not shown) for retaining the sleeve in position, as disclosed in U.S. Patent No. 2,740,271 issued April 3, 1956. The hubs 11 and 12 are preferably made of relatively rigid material, and the sleeve 15 is made of relatively flexible and resilient material. The sleeve 15 is adapted to snugly fit over the hubs and yield without slipping to permit unrestricted wobble of the hubs 11 and 12 within a limited range sufficient to take care of any small misalignment of the opposed shafts 13 and 14.

The construction of the shaft coupling sleeve 15 is shown in Fig. 3. The sleeve 15 is provided with a thin flexible load carrying band 21 to which the teeth 17 are secured. The load carrying band 21 may be made of one or more layers of fabric proportioned so as to produce a load carrying band which is sufficiently thin to flex without being strained or caused to overheat in operation. The teeth 17 are made of natural or synthetic rubber, preferably neoprene, and the base of each tooth is bonded to the load carrying band 21. The construction of the flexible load carrying band 21 and the teeth 17 may be modified in accordance with the teachings of the aforementioned U.S. Patent No. 2,859,599.

Fig. 4 illustrates the operation of the flexible shaft coupling at a position where the oppositely disposed shaft is out of alignment, the load carrying band 21 being broken away to show the operational flexing of the resilient teeth 17. As can be readily seen the deformed teeth 17 undergo a sharp change of plane at the free ends 22 of the lands 19 due to misalignment of the shaft and to the close proximity of the opposed hubs. This sharp change of plane wears and weakens the axially extending teeth at the land ends 22 and tends to actually cut the teeth 17 at this point. Fig. 5 illustrates a modification of the construction of the hubs which avoid the aforementioned disadvantages. As shown therein the free ends 22a of lands 19a are tapered and/or rounded to accept the deformed coupling teeth thereby eliminating the wearing of and tendency to cut the axially extending teeth 17a.

In operation, one of the shafts, for example shaft 13, will be the driving shaft and the driving force will be transferred from the grooves 18 and lands 19 of the hub 11 to the axially extending teeth 17. If the total included tooth angle (illustrated in Fig. 3 as angle B) is within the conventional range of between 10° and 20°, substantially all of the transferred force will appear as circumferential shear stress on the axially extending teeth 17 with only a slight radial stress on the load carrying band 21. This will result in premature failure of the axially extending teeth which cannot be reinforced to the extent necessary to resist such failure without detracting from the required flexibility of the teeth. Furthermore, the circumferential shear stress in the driven end of the flexible sleeve 15 will be in a direction opposite to the direction of the circumferential shear stress in the driving end of the sleeve 15. This will result in an additional circumferential shearing effect in the central portion of the sleeve 15. To avoid such serious difficulties, the axially extending teeth are constructed with a total included tooth angle of between 35° and 50°. Preferably this angle is between 40° and 45°. The force transferred from the grooves and lands of the hubs to the axially extending teeth, having an included tooth angle within the range specified, will be divided into two components, one component being circumferential shear stress resisted by the teeth 17 and the other component being a radial stress resisted by the load carrying band 21. If the included tooth angle is greater than the range specified, the radial stress will be increased causing the load carrying band 21 to expand whereby the axially extending teeth 17 will at least partially disengage from the grooves 18 in the hubs. This may be avoided by reinforcing the load carrying band 21 to increase its radial strength, but such reinforcing would impair the required axially flexibility of the coupling sleeve 15.

Thus by constructing the axially extending teeth of the flexible shaft coupling with an included tooth angle of between 35° and 50°, the flexible shaft coupling will resist circumferential shearing of the teeth and expansion of the load carrying band while at the same time remaining sufficiently flexible to allow for shaft misalignment.

While the preferred form of this invention has been described herein, it will be understood that changes in the details thereof may be made without departing from the spirit of this invention, and it is intended to cover all those changes which come within the scope of the appended claims.

Having thus described my invention, what I claim and desire to protect by Letters Patent is:

1. A shaft coupling comprising a pair of oppositely disposed hubs adapted to be connected to opposed shafts, said hubs having axially extending grooves in their peripheries, and an axially flexible coupling sleeve connecting said hubs, said sleeve comprising an axially flexible load carrying band and a plurality of flexible circumferentially spaced axially extending resilient teeth bonded to the periphery of said band with one end of each of said teeth extending into a groove in one hub and the other end extending into a groove in the opposite hub, said teeth having a total included tooth angle of between 35° and 50°.

2. A shaft coupling comprising a pair of oppositely disposed hubs connected to opposed shafts, said hubs having axially extending grooves in their outer peripheries with each of said grooves in one hub being aligned with a corresponding groove in the opposite hub, and an axially flexible coupling sleeve snugly fitting over said hubs, said sleeve comprising an axially flexible load carrying band and a plurality of flexible circumferentially spaced axially extending resilient teeth bonded to the inner periphery of said band with one end of each of said teeth extending into a groove in one hub and the other end extending into the aligned groove in the opposite hub, said teeth having a total included tooth angle of between 40° and 45°.

3. A shaft coupling comprising a pair of oppositely disposed hubs adapted to be connected to opposed shafts, said hubs having axially extending grooves separated by axially extending lands in their peripheries, and an axially flexible coupling sleeve connecting said hubs, said sleeve comprising an axially flexible load carrying band and a plurality of flexible circumferentially spaced axially extending resilient teeth bonded to the periphery of said band with one end of each of said teeth extending into a groove in one hub and the other end extending into a groove in the opposite hub, said teeth having a total included tooth angle of between 35° and 50° and said axially extending lands being tapered at their free ends.

4. A shaft coupling comprising a pair of oppositely disposed hubs connected to opposed shafts, said hubs having axially extending grooves separated by axially extending lands in their outer peripheries with each of said grooves in one hub being aligned with a corresponding groove in the opposite hub, and an axially flexible coupling sleeve snugly fitting over said hubs, said sleeve comprising an axially flexible load carrying band and a plurality of flexible circumferentially spaced axially extending resilient teeth bonded to the inner periphery of said band with one end of each of said teeth extending into a groove in one hub and the other end extending into the aligned groove in the opposite hub said teeth having a total included tooth angle of between 35° and 50° and said axially extending lands being rounded at their free ends.

5. A coupling sleeve for use in shaft couplings and the like comprising an axially flexible load carrying band and a plurality of flexible circumferentially spaced axially extending resilient teeth bonded to the periphery of said band, said teeth having a total included tooth angle of between 35° and 50°.

6. A coupling sleeve for connecting a pair of oppositely disposed hubs secured to opposed shafts, the hubs having axially extending grooves in their outer peripheries with each of said grooves in one hub being aligned with a corresponding groove in the other hub, comprising an axially flexible load carrying band and a plurality of flexible circumferentially spaced axially extending resilient teeth bonded to the inner periphery of said band with one end of each of said teeth adapted to extend into a groove in one hub and the other end adapted to extend into the aligned groove in the opposite hub, said teeth having a total included tooth angle of between 40° and 45°.

References Cited in the file of this patent

UNITED STATES PATENTS

| | | |
|---|---|---|
| 1,763,842 | Bibby | June 17, 1930 |
| 1,891,969 | Bibby | Dec. 27, 1932 |
| 2,859,599 | Case | Nov. 11, 1958 |
| 2,867,102 | Williams | Jan. 6, 1959 |